Dec. 7, 1943.                F. V. HOOFT                2,335,856
                      ORGANIC PEROXIDE COMPOSITION
                          Filed Nov. 23, 1940
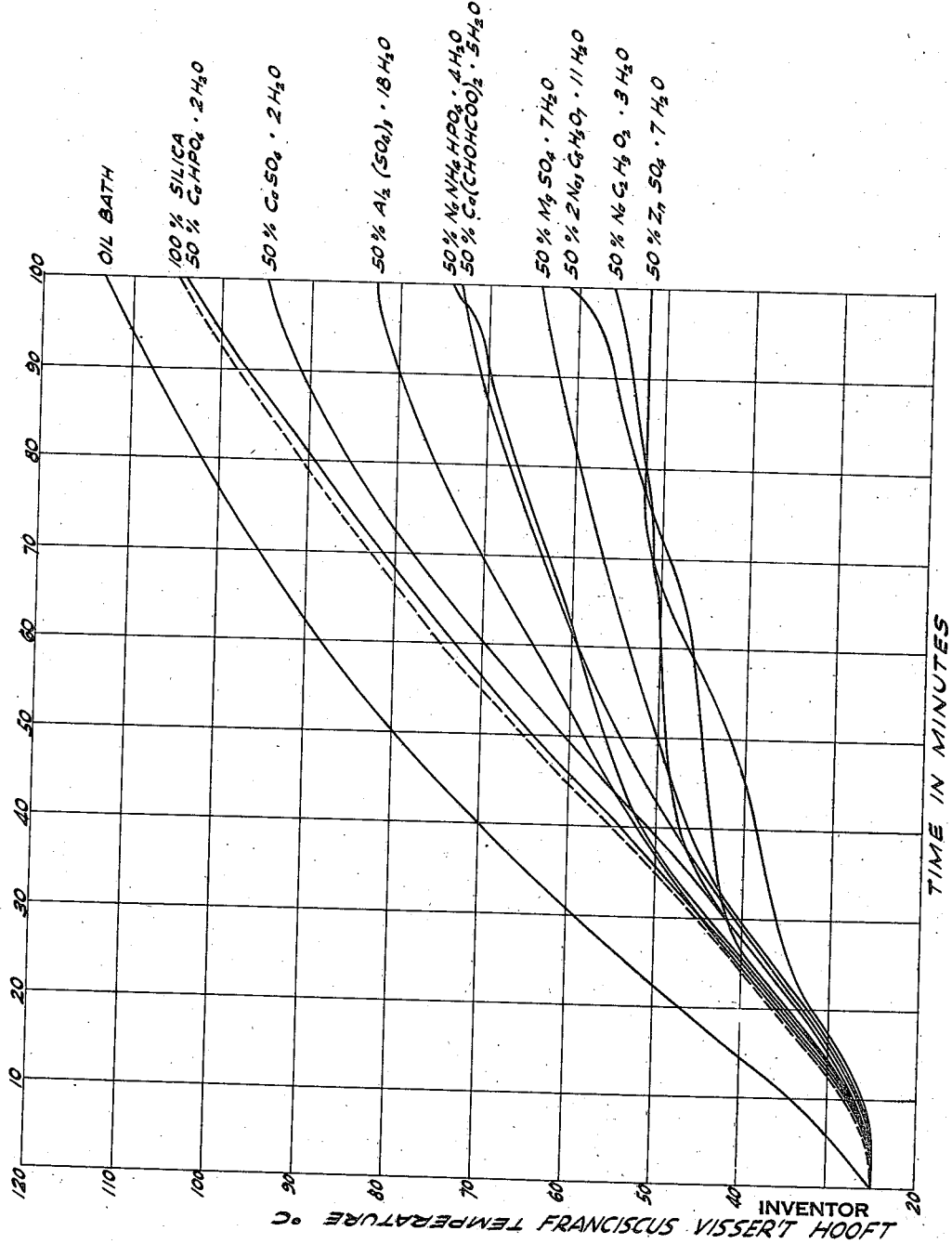
INVENTOR
FRANCISCUS VISSER'T HOOFT
BY
Beau, Brooks, Buckley & Beau.
ATTORNEYS Patented Dec. 7, 1943

2,335,856

UNITED STATES PATENT OFFICE 2,335,856

ORGANIC PEROXIDE COMPOSITION

Franciscus Visser't Hooft, Buffalo, N. Y., assignor to Lucidol Corporation, Buffalo, N. Y.

Application November 23, 1940, Serial No. 366,889

5 Claims. (Cl. 252—186)

This invention relates to compositions containing organic peroxides, especially acyl peroxides such as benzoyl peroxide. More particularly, it relates to such compositions which are of low heat sensitivity and relatively stable and non-inflammable.

The organic peroxides and more particularly the acyl peroxides are finding increased uses in the arts. All organic peroxides are more or less inflammable. The most widely used acyl peroxide, benzoyl peroxide, is classified as an inflammable solid and is being shipped and handled as such in large quantities. The ordinary precautions necessary with inflammable solids produce no hardship in some industries, such as the chemical industry, and are more or less routine procedure. On the other hand, in other industries it has been the custom to dilute the benzoyl peroxide with inert fillers to facilitate the handling of the product without the necessity for special precautions. Calcium sulfate dihydrate, dicalcium phosphate dihydrate and other inert fillers have been used for this purpose for many years. When used for certain purposes, such as the bleaching of flour, it is also desirable that the mixtures of benzoyl peroxide with these fillers be "free running," that is, that they run easily, quickly and uniformly under all atmospheric conditions through the feeding equipment customarily used for this purpose. Calcium sulfate dihydrate alone does not possess this property, since it has a tendency to form lumps, and accordingly it is necessary to remedy this, in accordance with U. S. Patent No. 2,207,737, by the use of lumping inhibitors such as magnesium carbonate, alumina hydrate, tribasic calcium phosphate, etc. Dicalcium phosphate dihydrate alone has a tendency to "cake," and this can be remedied, according to U. S. Patent No. 2,029,967, by the use of caking inhibitors such as calcium carbonate, etc.

It has been common practice to incorporate these fillers into final products having a benzoyl peroxide content of approximately 16%, and for this purpose fillers such as calcium sulfate dihydrate and dicalcium phosphate dihydrate are eminently suitable. For some purposes, however, it is desirable to have available higher strength products which can be handled with equal ease and without special precautions by industries such as the textile industry and the flour milling industry. It is the purpose of this invention to describe how such products with benzoyl peroxide strengths of 20 to 50%, and sometimes as high as 65%, can be prepared.

Benzoyl peroxide and other acyl peroxides are not only inflammable but are also sensitive to heat. While benzoyl peroxide is an extremely stable compound at temperatures up to 75° to 80° C., the decomposition reaction of the peroxide is exothermic. Once decomposition has started, the reaction produces heat to further raise the temperature so that complete decomposition occurs unless such heat of decomposition is taken up by the surrounding medium. Benzoyl peroxide heated to temperatures over 75° to 80° C., without special precautions, will eventually decompose completely with the formation of considerable quantities of inflammable gaseous products. While this decomposition goes slowly at 75° to 80° C., it proceeds rapidly at temperatures above 95° C. Such temperatures over 75° or 80° C. may well be encountered through local overheating in the process of manufacturing and preparing finely ground mixtures containing benzoyl peroxide, used customarily in the flour milling industry. Furthermore, such mixtures when being shipped must be sufficiently safe at these temperatures to not be subject to the special shipping regulations for inflammable solids. Finally, in the flour mills or other establishments where these finished mixtures are used, the steel drums or pails in which the mixtures are usually packed are occasionally accidentally placed near sources of heat such as steam pipes, radiators, etc., which may create temperature conditions in the containers over 75° or 80° C.

It is possible to heat small quantities of benzoyl peroxide without substantial decomposition to 106° to 107° C., at which temperature the peroxide melts. Larger quantities of benzoyl peroxide mixed with appropriate diluents to take up the initial heat of decomposition decompose comparatively slowly even when subjected to temperatures of 95° C. and above. However, diluents which are effective in producing safe compositions when incorporated with only 16% benzoyl peroxide are partially or completely ineffective when incorporated with more than 20% benzoyl peroxide, such as 25, 40, 50 or 65% benzoyl peroxide.

It has now been found that in accordance with this invention stable, safe, non-inflammable compositions of low heat sensitivity containing up to 65% benzoyl peroxide can be produced by incorporating as a diluent in the composition a solid hydrated temperature depressant having the special characteristics more fully described hereinafter. By the term "temperature depressant" I mean that the diluent should have a tendency to control the temperature of the mixture of which it is a component and keep it from rising too rapidly when such mixtures are subjected to elevated temperatures. This temperature controlling effect is caused partially or completely by the following factors:

a. The dehydration of the temperature depressant is an endothermic reaction which has a cooling effect on the surrounding medium. The evaporation of the free water formed has a further cooling effect on the medium.
b. The specific heat of the diluent.
c. The thermal conductivity of the diluent.

The first of these factors is easily the most important, and for all intents and purposes can be adopted as the measure of the suitability of a given compound. Accordingly, the amount of water of hydration, and the availability of this water for dehydration within the critical temperature range, is a quantitative measure of a compound's suitability. I have found that, in order to manufacture safe compositions containing over 20% benzoyl peroxide, the solid temperature depressant should contain at least 25% water of hydration. A considerable part and preferably the major part of this water should be removable between the temperatures of 40° C. and 120° C., and preferably between 60° C. and 100° C. Thus a compound which loses a considerable part of its water below 40° is not very effective, because such temperatures are encountered under normal atmospheric conditions. Similarly, compounds which do not lose much water unless heated over 120° C. are not very effective, because the benzoyl peroxide will have completely decomposed before such a temperature is reached.

In order to be classed as a temperature depressant for the purposes of the present invention, I have also found that the temperature depressing properties of the diluent should be effective at temperatures as close as possible to 75° or 80° C. at which temperatures benzoyl peroxide begins to slowly decompose and heat up at an accelerated rate unless controlled by some temperature controlling factor. The most effective temperature depressants are those compounds which exhibit this effect to a marked degree at temperatures below 95° C., but compounds which only exhibit this effect at temperatures from 95° C. to 120° C. may still be used either as the only diluent in mixtures of low benzoyl peroxide content or in mixtures of higher benzoyl peroxide content if at the same time a sufficient percentage of a stronger temperature depressant is present to keep the temperature controlled so as to prevent any accelerated decomposition of the benzoyl peroxide.

These temperature depressing properties, furthermore, should be effective under all conditions of atmosphere, presence of contaminating impurities, etc., normally encountered in practice. For example, the diluent should be capable of losing its water of hydration, at the temperatures indicated, in dry, moist, dusty or clean atmospheres. If water or dust acts as a positive or negative catalyst, so that water will not be lost under some conditions, the material cannot be considered "a safe temperature depressant" in every sense of the word.

Besides the characteristics outlined above, the temperature depressant should of course be itself non-inflammable at all temperatures. Furthermore, it should be comparatively inert with respect to benzoyl peroxide.

When used for the bleaching of flour and certain other purposes, the compositions of the present invention should be free running, non-hygroscopic, non-deliquescent, and substantially non-efflorescent. To accomplish this result, it is necessary to incorporate certain auxiliary fillers, such as tricalcium phosphate, etc., which prevent the compositions from lumping or caking. In addition, other previously known fillers, such as calcium sulfate dihydrate, may be added to the composition for other purposes. Finally, when used for bleaching flour and other milling products, the temperature depressant should be white and not objectionable from a pure food standpoint.

When used in the textile industry and for certain other purposes, however, the composition need not be free running or have the other characteristics mentioned in the preceding paragraph. For such uses, no auxiliary fillers are necessary, except to reduce the cost of the compositions.

Typical materials which satisfy these requirements include magnesium sulfate heptahydrate

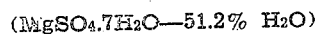
($MgSO_4.7H_2O$—51.2% $H_2O$)

calcium lactate pentahydrate

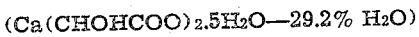
($Ca(CHOHCOO)_2.5H_2O$—29.2% $H_2O$)

aluminum sulfate octadecahydrate

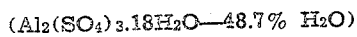
($Al_2(SO_4)_3.18H_2O$—48.7% $H_2O$)

sodium citrate undecahydrate

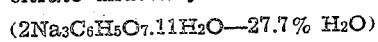
($2Na_3C_6H_5O_7.11H_2O$—27.7% $H_2O$)

sodium ammonium phosphate tetrahydrate

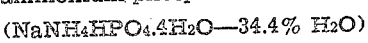
($NaNH_4PO_4.4H_2O$—34.4% $H_2O$)

zinc sulfate heptahydrate

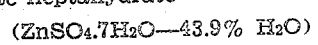
($ZnSO_4.7H_2O$—43.9% $H_2O$)

sodium acetate trihydrate

($NaC_2H_3O_2.3H_2O$—39.7% $H_2O$)

etc. Mixtures of these materials may be used if desired.

To illustrate the effectiveness of various materials as temperature depressants and as a further measure of the suitability of given compounds, the following test has been devised: 30 grams of each material under test are mixed with 30 grams of pure, ground silica. As a blank test for inert material one test is run with 60 grams of pure, ground silica. Each mixture is placed in a small flask, immersed in an oil bath, put under a slight vacuum in order to prevent the moisture released from condensing on the material being tested (which would not take place in commercial practice when larger quantities of materials are involved). Condensation of moisture would make it impossible to measure the true temperature depressing effect. The oil bath is then slowly heated for a period of about an hour and a half. The results of this test are given in the graph shown in the accompanying drawing. The results of similar tests on calcium sulfate dihydrate ($CaSO_4.2H_2O$) and dicalcium phosphate dihydrate ($CaHPO_4.2H_2O$) are also shown for comparison purposes.

It will be seen that as the temperature of the oil bath rises the temperatures of the tested materials also rise but at a slower rate than that of the oil bath. Since silica is an inert material, it parallels the temperature of the oil bath. Similarly the mixtures containing calcium sulfate dihydrate and dicalcium phosphate dihydrate heat up almost as rapidly as the silica alone. The remaining materials, however, do not rise above 80° C. in temperature even after one and one-half hours. This temperature, as I have pointed out previously, is a safe temperature for compositions containing benzoyl peroxide. In the same period of time the blank test for the inert material reaches 98° C. I have found that the temperature depressants according to the present invention should be capable of depressing the temperature at least 15° C. when measured according to the described test with silica at 100° C. At lower temperatures they should also be capable of reducing the temperatures, e. g. at least 10° C. at a temperature of 80° C.

The amount of the temperature depressant which it is necessary to incorporate in benzoyl peroxide compositions depends on the amount of benzoyl peroxide, the temperatures required to be withstood, and the quantity and nature of other fillers and diluents (referred to as "auxiliary fillers"), if any, in the composition. It may vary from 5% up to 80%, but preferably is within the range of 10% to 50%. The auxiliary fillers will in many cases be greater in amount than the temperature depressant, particularly where free running compositions are desired.

The invention having been described, the following examples are given of specific modes of practicing the invention.

Example 1

32 parts of benzoyl peroxide are mixed with 50 parts of calcium sulfate dihydrate, 10 parts of magnesium sulfate heptahydrate and 8 parts of basic tricalcium phosphate. The mixture is ground to a suitable fineness for use as a flour bleaching compound.

Example 2

23 parts of benzoyl peroxide are mixed with 77 parts of magnesium sulfate heptahydrate. The resulting mixture is ground to a suitable fineness. This material is suitable for use in various technical applications of peroxide compounds where no special free running or non-lumping characteristics are required.

Example 3

48 parts of benzoyl peroxide are mixed with 40 parts of magnesium sulfate heptahydrate and 12 parts of basic tricalcium phosphate. The resulting mixture is ground to a suitable fineness for use as a flour bleaching compound.

Example 4

32 parts of benzoyl peroxide are mixed with 10 parts of calcium lactate pentahydrate, 50 parts of calcium sulfate dihydrate and 8 parts of basic tricalcium phosphate. The mixture is ground to a suitable fineness for use as a flour bleaching compound.

Example 5

65 parts of benzoyl peroxide are mixed with 35 parts of magnesium sulfate heptahydrate. The resulting mixture is ground to a suitable fineness. This material is suitable for use in certain technical applications where highly concentrated peroxide compounds are needed and where no special free running or non-lumping characteristics are required.

The advantages of this invention can be demonstrated by the following tests for heat sensitivity and inflammability on the materials produced according to the above examples. Examples 1 and 4 were compared to a material produced according to Example 1 but containing no magnesium sulfate heptahydrate and 60 parts of calcium sulfate dihydrate instead of 50 parts (designated as Mixture A). Example 2 was compared to a material produced according to Example 2 but containing 77 parts of calcium sulfate dihydrate and no magnesium sulfate heptahydrate (designated as Mixture B). Example 3 was compared to a material produced according to Example 3 but containing 40 parts of calcium sulfate dihydrate and no magnesium sulfate heptahydrate (designated as Mixture C). Example 5, containing 65% benzoyl peroxide, was compared to Mixture C containing only 48% benzoyl peroxide because preliminary tests had indicated that stronger mixtures without temperature depressants decompose with a suddenness and at a rate approaching that of pure benzoyl peroxide.

25 grams of each material under test was placed in a shallow aluminum dish about 2.5" in diameter through the center of which passes a nichrome wire which was insulated from the dish. The resistance of this wire was 0.43 ohm per foot. The material in each dish was tamped down slightly so as to completely cover the wire. All the dishes under test were then placed in series with an ammeter and rheostat and an electric current passed through the wires so that an equal heat input was supplied to the material in each dish. For convenience in interpreting the results of these tests it should be remembered that the materials designated as Examples 1, 2, 3, 4 and 5 contain "temperature depressants" as claimed herein while the materials designated as Mixtures A, B and C contain no such "temperature depressants" but only certain prior known fillers.

When testing Examples 1 and 4 against Mixture A the rheostat was first set so that a current of 3.15 amperes passed through the wires for 3 minutes. This was done to preheat the materials. The current was then increased to 4.03 amperes. Mixture A started to decompose with formation of white fumes at 6½ minutes after the beginning of the test. At 11 minutes the decomposition was complete, as evidenced by the fact that no more fumes were given off and the entire mixture had turned a deep yellow. No decomposition was noted in Examples 1 and 4. Therefore the current was increased to 4.85 amperes 12 minutes after the beginning of the test. Example 4 then started to decompose at 13 minutes and the decomposition stopped at 14 minutes. The decomposition in Example 4 was confined to a narrow zone approximately ⅜" wide in the immediate vicinity of the wire. Example 1 started to decompose at 13½ minutes and the decomposition stopped at 14½ minutes. The decomposition was confined to a ⅜" zone as in Example 4.

When testing Example 2 against Mixture B the current was first turned to 3.15 amperes to preheat the materials. At this setting no decomposition was noted so the current was increased to 4.03 amperes at 11 minutes. Again no decomposition was noted and the current was increased to 4.85 amperes at 16 minutes. Mixture B started to decompose 18 minutes after the beginning of the test. It decomposed completely at 20 minutes after the beginning of the test. No decomposition was noted in Example 2 so the current was increased to 5.15 amperes at 21 minutes after the beginning of the test. A first sign of decomposition then occurred at 47 minutes. This decomposition was very slow without evidence of fumes. The decomposition apparently stopped at 59 minutes after the beginning of the test. The only decomposed material present was a narrow ribbon approximately 1/8 of an inch wide in the immediate vicinity of the wire.

When testing Example 3 against Mixture C the current was again first turned to 3.15 amperes to preheat the materials. Mixture C started to decompose 5 minutes after the beginning of the test and the decomposition was completely over in 15 seconds. This decomposition occurred with considerable violence. No decomposition was noted in Example 3 so the current was increased to 4.03 amperes at 11 minutes after the beginning of the test. Again no decomposition was noted, so the current was increased to 4.85 amperes at 16 minutes, and again increased to 5.15 amperes at 21 minutes after the beginning of the test. Decomposition started at 25 minutes. Decomposition continued for 30 seconds and then stopped completely. The decomposed material consisted of a zone approximately ½ inch wide in the immediate vicinity of the wire.

When testing Example 5 against Mixture C, the current was again first turned to 3.15 amperes to preheat the materials. Mixture C (containing 48% benzoyl peroxide) again started to decompose at 5 minutes after the beginning of the test and the decomposition was completely over in 15 seconds. The decomposition occurred with considerable violence. No decomposition was noted in Example 5 although it contained 65% benzoyl peroxide, so the current was increased to 4.03 amperes at 11 minutes after the beginning of the test. Again no decomposition was noted and the current was increased to 4.85 amperes at 16 minutes. Example 5 still did not decompose, so the current was increased to 5.15 amperes at 21 minutes. Decomposition started at 23½ minutes. Decomposition continued for 1 minute and then stopped completely. The decomposed material consisted of a zone approximately ¼" wide in the immediate vicinity of the wire.

It will be noted from the above tests that one of the outstanding characteristics of peroxide compounds containing "temperature depressants" is the fact that, when a thermal decomposition sets in, this decomposition is always strictly localized near the source of heat and never progresses completely throughout the entire mixture, as is the case in compounds containing no "temperature depressants." This clearly indicates the safety feature of the present invention.

When parts are given, parts by weight are understood.

As many variations are possible within the scope of this invention, it is not intended to be limited except as defined by the appended claims.

I claim:

1. A stable, safe composition of low heat sensitivity comprising 20 to 65% of benzoyl peroxide and magnesium sulfate heptahydrate.

2. A stable, safe composition of low heat sensitivity comprising 20 to 65% of benzoyl peroxide and 5 to 80% magnesium sulfate heptahydrate.

3. A stable, safe composition of low heat sensitivity comprising 20 to 65% of an organic peroxide, and magnesium sulfate heptahydrate.

4. A stable, safe composition of low heat sensitivity comprising 20 to 65% of benzoyl peroxide, magnesium sulfate heptahydrate and a lumping or caking inhibitor in sufficient quantity to render the composition free running.

5. A stable, safe composition of low heat sensitivity comprising 20 to 65% of benzoyl peroxide, 5 to 80% magnesium sulfate heptahydrate and a lumping or caking inhibitor in sufficient quantity to render the composition free running.

FRANCISCUS VISSER'T HOOFT.